Feb. 20, 1934.  H. BECKMANN  1,947,964
MANUFACTURE OF SCISSORS
Filed Nov. 29, 1932
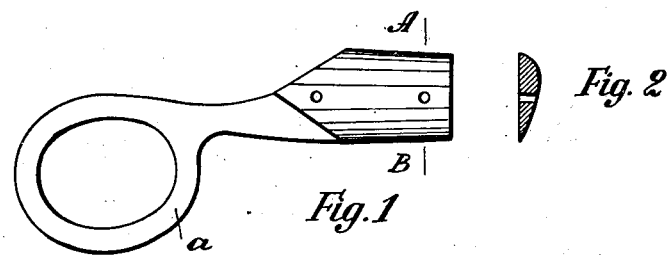
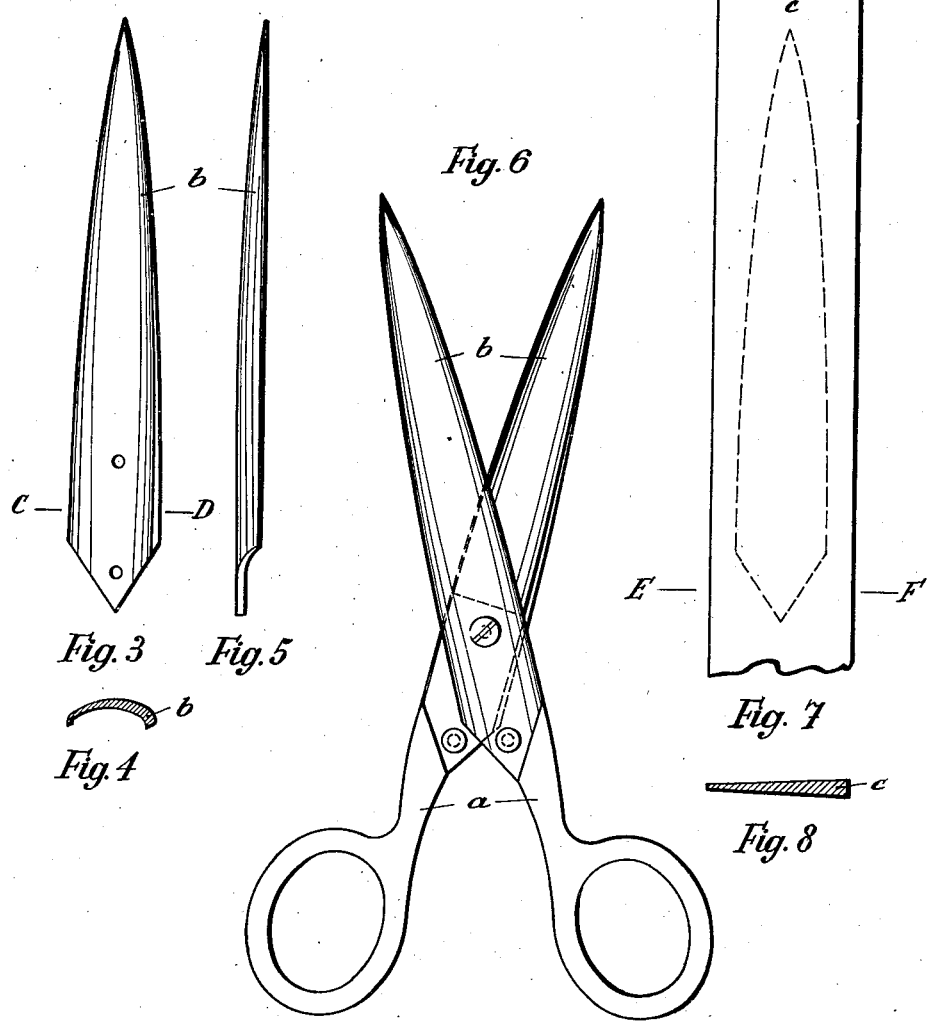
Inventor:
Hugo Beckmann Patented Feb. 20, 1934

1,947,964

UNITED STATES PATENT OFFICE 1,947,964

MANUFACTURE OF SCISSORS

Hugo Beckmann, Ohligs, Germany

Application November 29, 1932, Serial No. 644,843, and in Germany December 4, 1931

1 Claim. (Cl. 76—104)

This invention relates to the manufacture of scissors.

In scissors of the ordinary kind the grinding of the blades requires much time and the services of an experienced grinder, so that the expenses are considerable.

The invention proposes to overcome these drawbacks by omitting the grinding of the blades and insuring production of scissors for any purpose at low cost by separately producing the cutting blades and the handle members of the scissors, stamping the blades from a bright piece of tapered steel, hollow-pressing them and then polishing them without grinding them. The cutting blade thus produced is then connected with the handle members in suitable manner, such as by rivets or the like, the part of the handle member concerned being shaped so as to correspond to the hollow cutting blade.

One form of the invention is illustrated in the accompanying drawing, in which Figure 1 is a view of the handle member of a pair of scissors; Fig. 2, a section on the line A—B, of Fig. 1; Fig. 3, an inner view of a blade; Fig. 4, a section on the line C—D, of Fig. 3; Fig. 5, a top view of a blade in longitudinal direction; Fig. 6, a view of the scissors completely assembled; Fig. 7, a detail view of a piece of steel from which the blades are stamped; and Fig. 8, a section on the line E—F, of Fig. 7.

Referring to the drawing, a is the side piece and stamped out by a press. b is the blade which is stamped from a bright piece of tapered steel, then hollow-pressed and thus caused to have the curved form shown in Fig. 4. The next step is to unite the handle member and the blade by welding, riveting or in any other suitable manner, the parts of the handle members where the blades are to be attached having been previously adapted to the curved form of the blades by suitable machining. Further steps comprise hardening of the blades, insertion of the pin having preferably a conical shaft and being screwed into the threaded hole in the handle member and blade, and polishing which replaces the usual grinding process. The application of the method of production proposed by the invention makes it possible to manufacture scissors for any purpose and from the smallest up to the largest sizes. The conical back of the blades imparts strength to them and thus prevents them from dropping apart during cutting.

I claim:—

A method of producing scissors having separately made hollow cutting blades and handle members, which consists in stamping the handle members, stamping out the cutting blades from a bright piece of tapered steel, hollow-pressing the cutting blades, attaching the blades to correspondingly curved portions of the handle members by suitable means, and in polishing the cutting blades.

HUGO BECKMANN.